(12) United States Patent
Shitaba et al.

(10) Patent No.: US 10,243,215 B2
(45) Date of Patent: Mar. 26, 2019

(54) POSITIVE ELECTRODE ACTIVE MATERIAL INCLUDING LITHIUM TRANSITION METAL PARTICLES WITH GRAPHENE COATING LAYER POSITIVE ELECTRODE AND LITHIUM ION SECONDARY BATTERY INCLUDING THE SAME

(71) Applicant: TDK CORPORATION, Tokyo (JP)

(72) Inventors: Junpei Shitaba, Tokyo (JP); Hideaki Seki, Tokyo (JP); Hiroyuki Miyabara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 315 days.

(21) Appl. No.: 15/076,137

(22) Filed: Mar. 21, 2016

(65) Prior Publication Data

US 2016/0285102 A1 Sep. 29, 2016

(30) Foreign Application Priority Data

Mar. 27, 2015 (JP) .................................. 2015-066289
Feb. 3, 2016 (JP) .................................. 2016-018900

(51) Int. Cl.
*H01M 4/02* (2006.01)
*H01M 4/36* (2006.01)
*H01M 4/58* (2010.01)
*H01M 4/62* (2006.01)
*H01M 4/131* (2010.01)
(Continued)

(52) U.S. Cl.
CPC ........... *H01M 4/625* (2013.01); *H01M 4/131* (2013.01); *H01M 4/136* (2013.01); *H01M 4/366* (2013.01); *H01M 10/0525* (2013.01); *H01M 4/505* (2013.01); *H01M 4/525* (2013.01); *H01M 4/5825* (2013.01); *H01M 2004/021* (2013.01); *H01M 2004/028* (2013.01)

(58) Field of Classification Search
CPC ...... H01M 4/625; H01M 4/366; H01M 4/131; H01M 4/136; H01M 10/0525
USPC .................... 429/231.1, 231.95, 232, 231.8
See application file for complete search history.

(56) References Cited

U.S. PATENT DOCUMENTS

| | | | | |
|---|---|---|---|---|
| 2013/0052535 A1* | 2/2013 | Yanagihara | ........... | H01M 4/485 429/220 |
| 2013/0302693 A1* | 11/2013 | Sun | ........... | H01M 4/625 429/231.8 |
| 2014/0001413 A1* | 1/2014 | Otsuki | ........... | H01M 4/133 252/506 |

FOREIGN PATENT DOCUMENTS

| | | |
|---|---|---|
| CN | 102244236 A | 11/2011 |
| JP | 2004-087299 A | 3/2004 |

(Continued)

*Primary Examiner* — Sean P Cullen
(74) *Attorney, Agent, or Firm* — Oliff PLC

(57) ABSTRACT

A positive electrode active material for lithium ion secondary battery includes: active material particles including one or more compounds including Li and a transition metal; and a coating layer coating at least a part of a surface of the active material particles. The coating layer includes at least one of graphene or multilayer graphene The coating layer has a Raman spectrum with a G band (a peak of 1530 cm$^{-1}$ to 1630 cm$^{-1}$), a D band (a peak of 1300 cm$^{-1}$ to 1400 cm$^{-1}$), and a 2D band (a peak of 2650 cm$^{-1}$ to 2750 cm$^{-1}$). At least the intensity of the 2D band normalized by the intensity of the G band ($2D_{int}/G_{int}$) satisfies $0.05 \leq 2D_{int}/G_{int}$.

12 Claims, 1 Drawing Sheet

(51) Int. Cl.
*H01M 4/136* (2010.01)
*H01M 4/505* (2010.01)
*H01M 4/525* (2010.01)
*H01M 10/0525* (2010.01)

(56) References Cited

FOREIGN PATENT DOCUMENTS

| | | | |
|---|---|---|---|
| JP | 2006-164758 | A | 6/2006 |
| JP | 2007-173134 | A | 7/2007 |
| JP | 2012-022888 | A | 2/2012 |
| JP | 2012-234766 | A | 11/2012 |
| JP | 2013-084566 | A | 5/2013 |
| JP | 2014-510997 | A | 5/2014 |

* cited by examiner

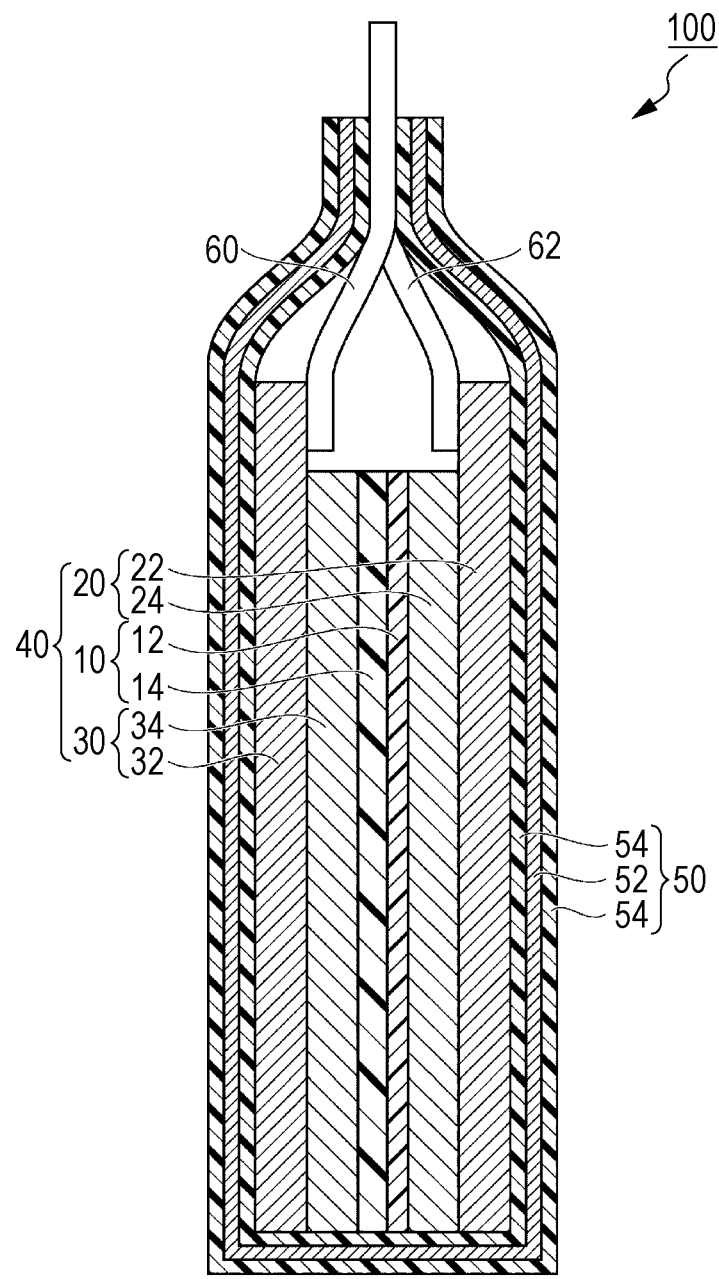

POSITIVE ELECTRODE ACTIVE MATERIAL INCLUDING LITHIUM TRANSITION METAL PARTICLES WITH GRAPHENE COATING LAYER POSITIVE ELECTRODE AND LITHIUM ION SECONDARY BATTERY INCLUDING THE SAME

CROSS-REFERENCE TO RELATED APPLICATION

This application claims priority from Japanese Patent Application No. 2015-066289 filed with the Japan Patent Office on Mar. 27, 2015, the entire content of which is hereby incorporated by reference.

BACKGROUND

1. Technical Field

The present disclosure relates to a positive electrode active material for lithium ion secondary battery, a positive electrode for lithium ion secondary battery, and a lithium ion secondary battery using the same.

2. Description of the Related Art

In recent years, lithium ion secondary batteries have attracted attention as a power supply for large devices, such as electric vehicles, as well as for mobile devices. Accordingly, further improvement and increase in the rate characteristics and energy density of the lithium ion secondary batteries are desired. The lithium ion secondary battery typically includes a positive electrode, a negative electrode, an electrolyte, and a separator. Among others, an improvement in rate characteristics can be expected by improving the characteristics of the positive electrode.

For example, JP-A-2007-173134 and JP-T-2014-510997 report techniques for decreasing the internal resistance of the positive electrode by coating the surface of positive electrode active material particles with conductive material. Further, in JP-A-2012-234766, the degree of carbonization (electronic conductivity) of a coating layer is controlled by means of the intensity ratio of a G band and a D band of a Raman spectrum of active material particles including carbon in the surface thereof. In this way, an improvement in rate characteristics can be obtained.

However, as the use of the lithium ion secondary battery become more widespread, a further improvement in rate characteristics is desired.

SUMMARY

A positive electrode active material for lithium ion secondary battery includes: active material particles including one or more compounds including Li and a transition metal; and a coating layer coating at least a part of a surface of the active material particles. The coating layer includes at least one of graphene or multilayer graphene. The coating layer has a Raman spectrum with a G band (a peak of 1530 cm$^{-1}$ to 1630 cm$^{-1}$), a D band (a peak of 1300 cm$^{-1}$ to 1400 cm$^{-1}$), and a 2D band (a peak of 2650 cm$^{-1}$ to 2750 cm$^{-1}$). At least the intensity of the 2D band normalized by the intensity of the G band ($2D_{int}/G_{int}$) satisfies $0.05 \leq 2D_{int}/G_{int}$.

BRIEF DESCRIPTION OF THE DRAWING

The FIGURE is a schematic cross sectional view of a lithium ion secondary battery according to the present embodiment.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a lithium ion secondary battery having high rate characteristics.

A positive electrode active material according to an embodiment of the present disclosure (the present positive electrode active material) includes active material particles having one or more compounds including Li and a transition metal, and a coating layer coating at least a part of a surface of the active material particles. The coating layer includes at least one of graphene or multilayer graphene. The coating layer has a Raman spectrum including a G band (a peak due to C-C stretching vibration and appearing between 1530 cm$^{-1}$ to 1630 cm$^{-1}$) and a 2D band (a peak due to the twice-inelastic scattering of phonons between the Dirac cones of a Brillouin-zone and appearing between 2650 cm$^{-1}$ to 2750 cm$^{-1}$), where the intensity of the 2D band normalized by the intensity of the G band ($2D_{int}/G_{int}$) satisfies $0.05 \leq 2D_{int}/G_{int}$.

By using the present positive electrode active material, a lithium ion secondary battery with high rate characteristics can be provided. This is believed due to the following. When the above conditions are satisfied by the Raman spectrum of the coating layer coating at least a part of the active material particle surface and including graphene or multilayer graphene, both good conductivity of the graphene or multilayer graphene per se and good conductivity between the graphene or multilayer graphene and the active material particles are achieved.

In the Raman spectrum in the coating layer of the present positive electrode active material, the intensity of the 2D band normalized by the intensity of the G band ($2D_{int}/G_{int}$) may satisfy $0.1 \leq 2D_{int}/G_{int}$.

When these conditions are satisfied, the conductivity of the graphene or multilayer graphene per se and the conductivity between the graphene or multilayer graphene and the active material particles are further increased. Accordingly, the rate characteristics are further improved.

According to an embodiment of the present disclosure, the positive electrode includes a positive electrode active material. At least a part of the active material particle surface of the positive electrode active material is coated with a coating layer including graphene or multilayer graphene, the coating layer exhibiting a Raman spectrum of which G band and 2D band satisfies $0.05 \leq 2D_{int}/G_{int}$.

The positive electrode has high rate characteristics.

A lithium ion secondary battery according to the present disclosure includes a positive electrode, a negative electrode, a separator disposed between the positive electrode and the negative electrode, and an electrolyte. The positive electrode includes the present positive electrode active material.

The lithium ion secondary battery has improved rate characteristics.

According to an embodiment of the present disclosure, there are provided a positive electrode active material with high rate characteristics, a positive electrode using the same, and a lithium ion secondary battery.

An example of a preferred embodiment of the lithium ion secondary battery according to the present disclosure will be described with reference to the drawings. It should be noted, however, that the lithium ion secondary battery according to the present disclosure is not limited to the following embodiments. The dimensional ratios of the drawings are not limited to the illustrated ratios.

Lithium Ion Secondary Battery

The electrodes and the lithium ion secondary battery according to the present embodiment will be briefly described with reference to the FIGURE. The lithium ion secondary battery 100 is mainly provided with a stacked body 40, a case 50 including layers 52 and 54 housing the stacked body 40 in a sealed state, and a pair of leads 60, 62 connected to the stacked body 40. While not shown in the drawings, an electrolyte is also housed in the case 50 along with the stacked body 40.

In the stacked body 40, a positive electrode 20 and a negative electrode 30 are disposed opposite each other across a separator 10 including layers 12 and 14. The positive electrode 20 includes a plate-like (film) positive electrode current collector 22, and a positive electrode active material layer 24 disposed on the positive electrode current collector 22. The negative electrode 30 includes a plate-like (film) negative electrode current collector 32 and a negative electrode active material layer 34 disposed on the negative electrode current collector 32. The positive electrode active material layer 24 and the negative electrode active material layer 34 are in contact with corresponding sides of the separator 10. To corresponding edge parts of the positive electrode current collector 22 and the negative electrode current collector 32, leads 62, 60 are connected. Edge parts of the leads 60, 62 are disposed outside the case 50.

Hereafter, the positive electrode 20 and the negative electrode 30 may be collectively referred to as the electrode 20, 30. The positive electrode current collector 22 and the negative electrode current collector 32 may be collectively referred to as the current collector 22, 32. The positive electrode active material layer 24 and the negative electrode active material layer 34 may be collectively referred to as the active material layer 24, 34.

Positive Electrode Active Material Layer

The positive electrode active material layer 24 mainly includes a positive electrode active material, a binder, and a conducting agent which may be used as required.

Positive Electrode Active Material

The positive electrode active material includes: active material particles including one or more compounds including Li and a transition metal; and a coating layer coating at least a part of a surface of the active material particles. The coating layer includes at least one of graphene or multilayer graphene. The coating layer has a Raman spectrum with a G band (a peak of 1530 $cm^{-1}$ to 1630 $cm^{-1}$), a D band (a peak of 1300 $cm^{-1}$ to 1400 $cm^{-1}$), and a 2D band (a peak of 2650 $cm^{-1}$ to 2750 $cm^{-1}$). At least the intensity of the 2D band normalized by the intensity of the G band ($2D_{int}/G_{int}$) satisfies $0.05 \leq 2D_{int}/G_{int}$.

When the intensity of the 2D band normalized by the intensity of the G band satisfies $0.05 \leq 2D_{int}/G_{int}$, the graphene or multilayer graphene included in the coating layer has high electronic conductivity and good contact properties with respect to irregularities on the surface of the active material particle surface. Thus, rate characteristics are improved.

Further, when the intensity of the 2D band normalized by the intensity of the G band ($2D_{int}/G_{int}$) satisfies $0.05 \leq 2D_{int}/G_{int} \leq 0.4$, not only the rate characteristics are improved but also the stability of paint at the time of electrode fabrication is increased, whereby an improvement in coating properties can be obtained.

Herein, graphene is a monoatomic layer substance with a structure of six-membered rings of carbon atoms densely laid on a plane. The multilayer graphene refers to substance including a plurality of stacked layers of graphene, with a thickness of not more than 100 nm.

Coating Layer

Preferably, the material (substance) of the coating layer satisfies the condition that, from the viewpoint of crystallinity of the material of the coating layer and adhesion thereof with the active material particles, the thickness of the material is not more than 20 nm.

The intensity of the 2D band normalized by the intensity of the G band ($2D_{int}/G_{int}$) may satisfy $0.1 \leq 2D_{int}/G_{int}$.

When the graphene or multilayer graphene included in the coating layer satisfies the above condition, the conductivity of the graphene or multilayer graphene per se, and the conductivity between the graphene or multilayer graphene and the active material particles are increased. Intercalation and deintercalation of Li from the active material particles are also facilitated, whereby rate characteristics are further improved.

The intensity of D band normalized by the intensity of the G band ($D_{int}/G_{int}$) may be such that $0.6 \leq D_{int}/G_{int} \leq 1.2$.

When the D band intensity normalized by G band satisfies $0.6 \leq D_{int}/G_{int}$, adhesion between graphene or multilayer graphene and active material particles is improved. When the D band intensity normalized by G band satisfies $D_{int}/G_{int} \leq 1.2$, the microcrystals of the graphene or multilayer graphene have a sufficient size for the graphene or multilayer graphene to exhibit good conductivity.

Active Material Particles

The active material particles include one or more compounds including Li and a transition metal. Examples of the compounds include lithium cobaltate represented by $LiCoO_2$; lithium manganese oxide represented by $LiMnO_2$; lithium nickelate represented by $Li_xNi_{(1-y-z)}Co_yAl_zO_2$ where $0.05 \leq x \leq 1.2$, $0 < y \leq 0.5$, $0 < z \leq 0.5$, and $y+z \leq 0.5$, or $Li_xNi_{(1-y-z)}Co_yMn_zO_2$ where $0.05 \leq x \leq 1.2$, $0 < y \leq 0.5$, $0 < z \leq 0.5$, and $y+z \leq 0.5$; lithium iron phosphate represented by $LiFePO_4$; manganese lithium phosphate represented by $LiMnPO_4$; and lithium vanadium phosphate represented by $LiVOPO_4$ or $Li_3V_2(PO_4)_3$. Among others, the compound represented by $Li_xNi_{(1-y-z)}Co_yAl_zO_2$ where $0.05 \leq x \leq 1.2$, $0 < y \leq 0.5$, $0 < z \leq 0.5$, and $y+z \leq 0.5$ has high capacity and may therefore be preferable.

The compound including Li and transition metal in the active material particles may be a mixture of one or more of the aforementioned compounds. When mixing the compounds, the graphene or multilayer graphene may preferably coat at least the compound represented by $Li_xNi_{(1-y-z)}Co_yAl_zO_2$ where $0.05 \leq x \leq 1.2$, $0 < y \leq 0.5$, $0 < z \leq 0.5$, and $y+z \leq 0.5$.

The type of the active material particles according to the present embodiment (the compound included in the active material particles) can be identified by, for example, X-ray diffraction, X-ray photoelectron spectroscopy, or energy dispersive X-ray spectrometry analysis. Among others, X-ray diffraction may preferably be used.

The active material particles may constitute secondary particles. When the active material particles constitute secondary particles, the secondary particles of the active material particles may have an average particle diameter of 500 nm to 50 μm. When the average particle diameter is in this range, the amount of graphene or multilayer graphene used for forming a sufficient coating layer on the active material particle surface can be decreased. In this way, the ratio of active material particles can be increased. In addition, the conductivity between the interior of the active material particles and the external electrons and Li ions can be increased, whereby the capacity of the positive electrode is improved.

The Raman spectrum of the coating layer formed on the active material particle surface according to the present embodiment including graphene or multilayer graphene can be measured by, for example, a laser Raman microscope.

The laser Raman microscope may use an Argon ion laser as a light source. For the measurement of the Raman spectrum, a known Raman measurement device using an Argon ion laser may be used. The Raman spectrum may be measured by, for example, the Raman measurement device using the Argon ion laser of wavelength 514.532 nm.

The measured Raman spectrum includes G band, D band (a peak due to the elastic scattering and inelastic scattering of phonons respectively once between Dirac cones in a Brillouin-zone and appearing at 1300 $cm^{-1}$ to 1400 $cm^{-1}$), and 2D band. With respect to wavenumber ranges in the Raman spectrum excepting the G band, D band, and 2D band (700 $cm^{-1}$ to 1100 $cm^{-1}$, 1800 $cm^{-1}$ to 2500 $cm^{-1}$, and 2850 $cm^{-1}$ to 3100 $cm^{-1}$), fitting is performed using a quadratic function. Using the quadratic function as a base line, the intensities of the G band and 2D band are obtained. A plurality of measurements may be taken and an average of measurement values may be calculated. In this case, the measurement may be repeated until the standard deviation of noise with respect to the G band intensity becomes 5% or below.

Positive Electrode Current Collector

The positive electrode current collector 22 may be a plate of conductive material. For example, as the positive electrode current collector 22, a metal thin plate with an aluminum, copper, or nickel foil may be used.

Positive Electrode Binder

The binder binds the active materials and also binds the active materials with the current collector 22. The binder may be any binder capable of achieving the above binding. Examples of the binder include fluorine resin such as polyvinylidene fluoride (PVDF), polytetrafluoroethylene (PTFE), tetrafluoroethylene/hexafluoropropylene copolymer (FEP), tetrafluoroethylene/perfluoro alkyl vinyl ether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF).

Other than the above examples, vinylidene fluoride fluorine rubber may be used as the binder. Examples of fluorine rubber based on vinylidene fluoride include fluorine rubber based on vinylidene fluoride/hexafluoropropylene (VDF/HFP-based fluorine rubber), fluorine rubber based on vinylidene fluoride/hexafluoropropylene/tetrafluoroethylene (VDF/HFPTFE-based fluorine rubber), fluorine rubber based on vinylidene fluoride/pentafluoropropylene (VDF/PFP-based fluorine rubber), fluorine rubber based on vinylidene fluoride/pentafluoropropylene/tetrafluoroethylene (VDF/PFP/TFE-based fluorine rubber), fluorine rubber based on vinylidene fluoride/perfluoromethyl vinyl ether/tetrafluoroethylene (VDF/PFMVE/TFE-based fluorine rubber), and fluorine rubber based on vinylidene fluoride/chlorotrifluoroethylene (VDF/CTFE-based fluorine rubber).

As the binder, a conductive polymer having electronic conductivity or conductive polymer having ion conductivity may be used. An example of the conductive polymer having electronic conductivity is polyacetylene. In this case, the binder will also serve as conductive material, so that other conductive material may not be added. An example of the conductive polymer having ion conductivity is a composite of polymer compound, such as polyethylene oxide or polypropylene oxide, and a lithium salt or an alkali metal salt based on lithium.

Conducting Agent

By forming the coating layer including graphene or multilayer graphene on the active material particle surface, the battery can exhibit high rate characteristics without adding conducting agent at the time of electrode fabrication. However, by adding small amounts of carbon material with small particle diameter, such as carbon black or acetylene black, at the time of paint preparation, the rate characteristics can be further improved. This is believed due to an increase, caused by the carbon material with small particle diameter, in electric conductivity at the points of contact of the coating layers including graphene or multilayer graphene.

Negative Electrode Active Material Layer

The negative active material layer 34 mainly includes a negative electrode active material, a binder, and a conducting agent which may be used as required.

Negative Electrode Active Material

The negative electrode active material may be a compound capable of lithium ion intercalation and deintercalation. As the negative electrode active material, known negative electrode active material for lithium-ion batteries may be used. As the negative electrode active material, substance capable of lithium ion intercalation and deintercalation may be used. Examples of such substance include carbon material such as graphite (natural graphite and synthetic graphite), carbon nanotube, hard carbon, soft carbon, and low temperature heat-treated carbon; metals that can be combined with lithium, such as aluminum, silicon, and tin; amorphous compound based on an oxide such as silicon dioxide and tin dioxide; and particles including lithium titanate ($Li_4Ti_5O_{12}$) or the like. The negative electrode active material may be graphite, which has high capacity per unit weight and is relatively stable.

Negative Electrode Current Collector

The negative electrode current collector 32 may be a plate of conductive material. As the negative electrode current collector 32, a metal thin plate including aluminum, copper, or nickel foil may be used.

Negative Electrode Conductive Material

Examples of the conductive material include carbon material such as carbon powder of carbon black and the like, and carbon nanotube; metal fine powder of copper, nickel, stainless, or iron; a mixture of carbon material and metal fine powder; and conductive oxide such as ITO.

Negative Electrode Binder

As the binder used in the negative electrode, materials similar to those for the positive electrode may be used.

Separator

The material of the separator 10 may have an electrically insulating porous structure. Examples of the material include a single-layer body or stacked body of polyethylene, polypropylene, or polyolefin film; extended film of a mixture of the aforementioned resins; and fibrous nonwoven fabric including at least one constituent material selected from the group consisting of cellulose, polyester, and polypropylene.

Non-Aqueous Electrolyte

The non-aqueous electrolyte includes electrolyte dissolved in non-aqueous solvent. The non-aqueous solvent may contain cyclic carbonate and chain carbonate.

The cyclic carbonate is not particularly limited as long as it is capable of solvating the electrolyte, and known cyclic carbonate may be used. Examples of the cyclic carbonate include ethylene carbonate, propylene carbonate, and butylene carbonate.

The chain carbonate is not particularly limited as long as it is capable of decreasing the viscosity of the cyclic carbonate, and known chain carbonate may be used. Examples of the chain carbonate include diethyl carbonate, dimethyl carbonate, and ethyl methyl carbonate. As the chain carbonate, there may be used a mixture of methyl acetate, ethyl acetate, methyl propionate, ethyl propionate, γ-butyrolactone, 1,2-dimethoxyethane, 1,2-diethoxyethane, and the like.

The ratio of the cyclic carbonate and the chain carbonate in the non-aqueous solvent may be 1:9 to 1:1 by volume.

Examples of the electrolyte include lithium salts such as $LiPF_6$, $LiClO_4$, $LiBF_4$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of the lithium salts may be used individually, or two or more lithium salts may be used in combination. Particularly, from the viewpoint of degree of ionization, the electrolyte may preferably include $LiPF_6$.

When $LiPF_6$ is dissolved in non-aqueous solvent, the concentration of the electrolyte in the non-aqueous electrolyte may be adjusted to 0.5 to 2.0 mol/L. When the electrolyte concentration is 0.5 mol/L or more, sufficient lithium ion concentration of the non-aqueous electrolyte can be ensured. As a result, sufficient capacity can be more readily obtained during charging/discharging. Further, by limiting the electrolyte concentration to 2.0 mol/L or less, an increase in the viscosity of the non-aqueous electrolyte can be suppressed, and sufficient lithium ion mobility can be ensured. As a result, sufficient capacity can be more readily obtained during charging/discharging.

When $LiPF_6$ is mixed with other electrolytes, the lithium ion concentration in the non-aqueous electrolyte may be adjusted to 0.5 to 2.0 mol/L. Of the lithium ions in the non-aqueous electrolyte, the lithium ions from $LiPF_6$ may have a concentration of 50 mol % or more.

Method for Manufacturing Positive Electrode Active Material

The positive electrode active material according to the present embodiment can be manufactured by the following coating layer forming process.

Coating Layer Forming Process

In the coating layer forming process, a coating layer including graphene or multilayer graphene is formed on the surface of the active material particles. The method for forming the coating layer is not particularly limited, and an existing method for forming a coating layer on a particle surface may be used. The method may include, for example, a mechanochemical method using mechanical energy, such as friction and compression, and a spray dry method of spraying coating liquid onto the particles. Among others, the mechanochemical method may be preferable as it enables formation of a uniform coating layer with good adhesion.

Specific examples of the manufacturing devices for the mechanochemical method include devices such as a Mechanofusion device and a planetary mill. A specific example of the device for the spray dry method is a spray drier. Among others, the mechanochemical method may be preferable as it enables application of shear stress to powder. An example of the manufacturing device is a Mechanofusion device.

The intensity ratio of G band and 2D band in the coating layer of the active material particle surface including graphene or multilayer graphene is dependent on the defect density and the number of layers of the graphene or multilayer graphene included in the coating layer. For example, when the coating layer is formed by the mechanochemical method enabling the application of shear stress to powder, the intensity of the G band and 2D band of the Raman spectrum can be adjusted by appropriately adjusting the angle and rotational speed of the processing device, processing time, and material feed amount, and by adjusting the thermal process after the coating layer formation.

Method for Manufacturing Electrodes 20, 30

A method for manufacturing the electrode 20 and 30 according to the present embodiment will be described.

The active material, binder, and solvent are mixed to prepare a paint. If necessary, conductive material may be further added. As the solvent, water or N-methyl-2-pyrrolidone may be used. The method of mixing the components of the paint is not particularly limited. The order of mixing is also not particularly limited. The paint is coated onto the current collectors 22 and 32. The coating method is not particularly limited, and a method typically adopted for electrode fabrication may be used. The coating method may include slit die coating and doctor blade method.

Thereafter, the solvent in the paint coating the current collectors 22 and 32 is removed. The removing method is not particularly limited, and may include drying the current collectors 22 and 32 with the paint coat thereon in an atmosphere of 80° C. to 150° C.

The resulting electrodes with the positive electrode active material layer 24 and the negative electrode active material layer 34 respectively formed thereon are pressed by a roll press device or the like as needed. The roll press may have a linear load of 1000 kgf/cm, for example.

Through the above-described steps, there are obtained the positive electrode 20 including the positive electrode current collector 22 with the positive electrode active material layer 24 formed thereon, and the negative electrode 30 including the negative electrode current collector 32 with the negative electrode active material layer 34 formed thereon.

Method for Manufacturing Lithium Ion Secondary Battery

In the following, a method for manufacturing the lithium ion secondary battery 100 according to the present embodiment will be described. The method for manufacturing the lithium ion secondary battery 100 according to the present embodiment includes a step of sealing, in the case (exterior body) 50, the positive electrode 20 and the negative electrode 30 including the above-described active materials, the separator 10 to be disposed between the positive electrode 20 and the negative electrode 30, and the nonaqueous electrolytic solution including lithium salt.

For example, the positive electrode 20 and the negative electrode 30 including the above-described active materials, and the separator 10 are stacked. The positive electrode 20 and the negative electrode 30 are heated and pressed from a direction perpendicular to the stacked direction, using a pressing tool. In this way, the stacked body 40 including the positive electrode 20, the separator 10, and the negative electrode 30 that are mutually closely attached is obtained. The stacked body 40 is then put into a pre-fabricated bag of the case 50, for example, and additionally the nonaqueous electrolytic solution including the above-described lithium salt is injected. In this way, the lithium ion secondary battery 100 is fabricated. Instead of injecting the nonaqueous electrolytic solution including the lithium salt into the case 50, the stacked body 40 may be impregnated in advance in a nonaqueous electrolytic solution including the lithium salt.

It should be noted, however, that the present disclosure is not limited to the embodiment, and that the embodiment is merely illustrative. Any and all configurations that are substantially identical, either in operation or effect, to the technical concept set forth in the claims are included in the technical scope of the present disclosure.

EXAMPLES

Example 1

Fabrication of Positive Electrode $Li_{1.0}Ni_{0.83}Co_{0.14}Al_{0.03}O_{2.0}$ particles with an average particle diameter of the secondary particles of 15 μm as the active material particles including one or more compounds including Li and a transition metal (hereafter referred to as NCA), and multilayer graphene with an average thickness of 8 nm and an average length of major radius and minor radius of 15 μm were weighed at a mass ratio of 100:2. The weighed NCA and graphene were processed using a Hosokawa Micron Mechanofusion system inclined at 5° and at a rotational speed of 3500 rpm for 20 minutes, forming a coating layer including multilayer graphene on the surface of NCA. The NCA with the coating layer formed thereon was subjected to an anneal process in a vacuum atmosphere at 400° C. for 30 minutes. In this way, the intensity of the G band and 2D band of the Raman spectrum was adjusted. A slurry was prepared by dispersing 97.5% of the positive electrode active material powder and 2.5% of polyvinylidene fluoride (PVDF) N-methyl-2-pyrrolidone (NMP). The slurry was coated on an aluminum foil with a thickness of 15 The aluminum foil coated with the slurry was dried at a temperature of 120° C. for 30 minutes, and then pressed using a roll press device at a linear load of 1000 kgf/cm. Thus, a positive electrode was obtained.

Measurement of Multilayer Graphene Coating Layer in Positive Electrode

The coating state of the coating layer including multilayer graphene on the NCA particle surface was measured using a transmission electron microscope (TEM), a scanning electron microscope (SEM), a laser Raman microscope, a cross section polisher, and an ion milling device. Measurement samples were fabricated by cutting the positive electrode and polishing the section using the cross section polisher and the ion milling device.

The Raman spectrum of the coating layer including multilayer graphene on the NCA particle surface was measured by observing the electrode surface using the laser Raman microscope.

Through the observation of the positive electrode surface and the positive electrode cross section by SEM, EDX, and IEM, formation of a uniform coating layer including multilayer graphene on the NCA particle surface was confirmed. Further, the thickness of the coating layer was measured by SEM at four locations on each of 50 NCA particles. As a result, it was learned that the coating layer had an average thickness of 190 nm.

By Raman mapping measurement of the positive electrode cross section by the laser Raman microscope, formation of the coating layer including multilayer graphene on the NCA particle surface was confirmed.

Fabrication of Negative Electrode

A slurry was prepared by dispersing 90 parts by mass of natural graphite powder as the negative electrode active material and 10 parts by mass of PVDF in NMP. The slurry was coated on a copper foil with a thickness of 15 The copper foil with the slurry coated thereon was dried under reduced pressure at a temperature of 140° C. for 30 minutes, and then pressed using a roll press device. In this way, the negative electrode was obtained.

Nonaqueous Electrolytic Solution

In a mixture solvent of ethylene carbonate (EC) and diethyl carbonate (DEC), $LiPF_6$ was dissolved to 1.0 mol/L, and further $LiBF_4$ was dissolved to 0.1 mol/L, whereby a nonaqueous electrolytic solution was obtained. In the mixture solvent, the volume ratio of EC and DEC was EC:DEC=30:70.

Separator

A microporous polyethylene film (pore ratio: 40%, shut down temperature: 134° C.) with a film thickness of 20 μm was prepared.

Battery Fabrication

A power generating element was constructed by stacking the positive electrode, the negative electrode, and the separator. The power generating element and the non-aqueous electrolyte were used to fabricate a battery cell according to Example 1.

C Rate

The current density such that the battery cell capacity is charged or discharged in an hour is referred to as 1 C. In the following, the current density at the time of charging or discharging will be expressed using constant multiples of the C rate (For example, the current density of one half of 1 C will be expressed as 0.5 C).

Measurement of Rate Characteristics

Using the fabricated battery cell of Example 1, constant current charging was performed at the current density of 0.1 C until voltage reached 4.2 V (vs. $Li/Li^+$). Further, constant voltage charging was performed at 4.2 V (vs. $Li/Li^+$) until the current density decreased to 0.05 C, when the charge capacity was measured.

After a pause of 5 minutes, constant current discharging was performed at the current density of 0.1 C until voltage reached 2.5 V (vs. $Li/Li^+$), when the discharge capacity was measured. The current density was calculated assuming that 1 C corresponded to 190 mAh per 1 g by mass of the active material.

The rate characteristics of the battery cell were measured by repeating the charging/discharging procedure while changing the charging/discharging current density to 0.3 C, 0.5 C, 1 C, and 0.1 C.

Examples 2 to 7, Comparative Examples 1 to 4

In Examples 2 to 7 and Comparative Examples 1 to 4, the processing condition when forming the coating layer including multilayer graphene on the active material particle surface using the Hosokawa Micron Mechanofusion system, and thermal processing condition after the coating layer formation were modified. In this way, positive electrodes including the coating layer with different Raman spectra were fabricated, and battery cells were fabricated in the same way as in Example 1 and evaluated. In Comparative Examples 3 and 4, the coating layer using carbon black was formed on the active material particle surface. The processing condition and the thermal processing condition after the coating layer formation were modified, and the positive electrodes including the coating layer with different Raman spectra were fabricated. Battery cells were fabricated in the same way as in Example 1 and evaluated. The results are shown in Table 1.

TABLE 1

| | Active material | Coating film formation condition | | Raman spectrum | | Rate characteristics 1 C capacity/ 0.1 C capacity |
| | | Mechanofusion processing condition | Thermal processing condition | D band intensity/ G band intensity | 2D band intensity/ G band intensity | |
|---|---|---|---|---|---|---|
| Example 1 | $Li_{1.0}Ni_{0.83}Co_{0.14}Al_{0.03}O_{2.0}$ | 3500 rpm, 20 min | 400° C., 30 min @vacuum | 1.02 | 0.092 | 78% |
| Example 2 | $Li_{1.0}Ni_{0.83}Co_{0.14}Al_{0.03}O_{2.0}$ | 3500 rpm, 20 min | 400° C., 60 min @vacuum | 0.964 | 0.134 | 84% |
| Example 3 | $Li_{1.0}Ni_{0.83}Co_{0.14}Al_{0.03}O_{2.0}$ | 3000 rpm, 20 min | 300° C., 60 min @vacuum | 0.828 | 0.190 | 83% |
| Example 4 | $Li_{1.0}Ni_{0.83}Co_{0.14}Al_{0.03}O_{2.0}$ | 3000 rpm, 20 min | 400° C., 30 min @vacuum | 0.701 | 0.236 | 83% |
| Example 5 | $Li_{1.0}Ni_{0.83}Co_{0.14}Al_{0.03}O_{2.0}$ | 3000 rpm, 20 min | 400° C., 60 min @vacuum | 0.632 | 0.308 | 85% |
| Example 6 | $Li_{1.0}Ni_{0.83}Co_{0.14}Al_{0.03}O_{2.0}$ | 2700 rpm, 20 min | 400° C., 30 min @vacuum | 0.557 | 0.345 | 84% |
| Example 7 | $Li_{1.0}Ni_{0.83}Co_{0.14}Al_{0.03}O_{2.0}$ | 2700 rpm, 20 min | 400° C., 60 min @vacuum | 0.513 | 0.420 | 85% |
| Comparative Example 1 | $Li_{1.0}Ni_{0.83}Co_{0.14}Al_{0.03}O_{2.0}$ | 3500 rpm, 20 min | 300° C., 30 min @vacuum | 1.267 | 0.040 | 62% |
| Comparative Example 2 | $Li_{1.0}Ni_{0.83}Co_{0.14}Al_{0.03}O_{2.0}$ | 3500 rpm, 20 min | 300° C., 60 min @vacuum | 1.121 | 0.045 | 66% |
| Comparative Example 3 | $Li_{1.0}Ni_{0.83}Co_{0.14}Al_{0.03}O_{2.0}$ | 3500 rpm, 20 min | 400° C., 60 min @vacuum | 0.981 | 0.031 | 54% |
| Comparative Example 4 | $Li_{1.0}Ni_{0.83}Co_{0.14}Al_{0.03}O_{2.0}$ | 3500 rpm, 20 min | 400° C., 30 min @vacuum | 1.112 | 0.025 | 51% |

* Carbon black coating film in Comparative Examples 4 and 5

From Table 1, it is seen that the positive electrode active material with the coating layer including graphene or multilayer graphene formed on at least a part of the NCA particle surface exhibits high rate characteristics among the positive electrode active material with similar composition ratios when, with respect to the Raman spectrum in the coating layer, the intensity of 2D band normalized by the intensity of G band ($2D_{int}/G_{int}$) satisfies $0.05 \leq 2D_{int}/G_{int}$.

It is also seen that the rate characteristics are further improved and the battery energy density is further increased when, in addition to the above intensity ratio range of the G band and 2D band of the Raman spectrum, $0.1 \leq 2D_{int}/G_{int}$ is satisfied.

The results also indicate that higher rate characteristics can be exhibited by using multilayer graphene than carbon black as the material of the coating layer (coating film) of the active material particle surface.

Example 8 to 11 and Comparative Example 5

In Example 8 to 11 and Comparative Example 5, the active material particles of the positive electrode were modified to lithium cobaltate particles with an average particle diameter of secondary particles of 20 μm. Further, the processing condition during the formation of the coating layer including multilayer graphene on the active material particle surface with the Hosokawa Micron Mechanofusion system, and the thermal processing condition after the coating layer formation were modified. In this way, positive electrodes including the coating layer with different Raman spectra were fabricated, and battery cells were fabricated in the same way as in Example 1 and evaluated. The results are shown in Table 2.

It is seen from Table 2 that the positive electrode active material with the coating layer including graphene or multilayer graphene formed on at least a part of the particle surface of lithium cobaltate ($Li_{1.0}Co_{1.0}O_{2.0}$) exhibit high rate characteristics among the positive electrode active material with similar composition ratios when, with respect to the Raman spectrum in the coating layer, the intensity of 2D band normalized by the intensity of G band ($2D_{int}/G_{int}$) satisfies $0.05 \leq 2D_{int}/G_{int}$.

It is also seen that the rate characteristics can be further improved when, in addition to the intensity ratio range of the G band and 2D band of the Raman spectrum, $0.1 \leq 2D_{int}/G_{int}$ is satisfied.

Examples 12 to 15 and Comparative Example 6

In Examples 12 to 15 and Comparative Example 6, the active material particles of the positive electrode were modified to ternary positive electrode active material ($Li_{1.0}Ni_{1/3}Mn_{1/3}Co_{1/3}O_{2.0}$) particles with an average particle diameter of secondary particles of 10 μm. Further, the processing condition during the formation of the coating layer including multilayer graphene on the active material particle surface with the Hosokawa Micron Mechanofusion system, and thermal processing condition after the coating layer formation were modified, and positive electrodes including the coating layer with different Raman spectra were fabricated. Battery cells were fabricated in the same way as in Example 1 and evaluated. The results are shown in Table 3.

TABLE 2

| | Active material | Coating film formation condition | | Raman spectrum | | Rate characteristics |
| | | Mechanofusion processing condition | Thermal processing condition | D band intensity/ G band intensity | 2D band intensity/ G band intensity | 1 C capacity/ 0.1 C capacity |
|---|---|---|---|---|---|---|
| Example 8 | $Li_{1.0}Co_{1.0}O_{2.0}$ | 3500 rpm, 20 min | 400° C., 30 min @vacuum | 1.015 | 0.083 | 73% |
| Example 9 | $Li_{1.0}Co_{1.0}O_{2.0}$ | 3000 rpm, 20 min | 400° C., 30 min @vacuum | 0.955 | 0.136 | 80% |
| Example 10 | $Li_{1.0}Co_{1.0}O_{2.0}$ | 2700 rpm, 20 min | 400° C., 30 min @vacuum | 0.618 | 0.304 | 81% |
| Example 11 | $Li_{1.0}Co_{1.0}O_{2.0}$ | 2700 rpm, 20 min | 400° C., 60 min @vacuum | 0.514 | 0.438 | 81% |
| Comparative Example 5 | $Li_{1.0}Co_{1.0}O_{2.0}$ | 3500 rpm, 20 min | 300° C., 30 min @vacuum | 1.218 | 0.039 | 58% |

TABLE 3

| | Active material | Coating film formation condition | | Raman spectrum | | Rate characteristics |
|---|---|---|---|---|---|---|
| | | Mechanofusion processing condition | Thermal processing condition | D band intensity/ G band intensity | 2D band intensity/ G band intensity | 1 C capacity/ 0.1 C capacity |
| Example 12 | $Li_{1.0}Ni_{1/3}Mn_{1/3}Co_{1/3}O_{2.0}$ | 3500 rpm, 20 min | 300° C., 60 min @vacuum | 1.152 | 0.065 | 72% |
| Example 13 | $Li_{1.0}Ni_{1/3}Mn_{1/3}Co_{1/3}O_{2.0}$ | 3500 rpm, 20 min | 400° C., 30 min @vacuum | 0.882 | 0.167 | 81% |
| Example 14 | $Li_{1.0}Ni_{1/3}Mn_{1/3}Co_{1/3}O_{2.0}$ | 3000 rpm, 20 min | 400° C., 60 min @vacuum | 0.638 | 0.293 | 82% |
| Example 15 | $Li_{1.0}Ni_{1/3}Mn_{1/3}Co_{1/3}O_{2.0}$ | 2700 rpm, 20 min | 400° C., 30 min @vacuum | 0.555 | 0.423 | 84% |
| Comparative Example 6 | $Li_{1.0}Ni_{1/3}Mn_{1/3}Co_{1/3}O_{2.0}$ | 3500 rpm, 20 min | 300° C., 30 min @vacuum | 1.317 | 0.045 | 64% |

It is seen from Table 3 that the positive electrode active material with the coating layer including graphene or multilayer graphene formed on at least a part of the particle surface of ternary positive electrode active material ($Li_{1.0}Ni_{1/3}Mn_{1/3}Co_{1/3}O_{2.0}$) exhibit high rate characteristics among the positive electrode active material with similar composition ratios when, with respect to the Raman spectrum in the coating layer, the intensity of 2D band normalized by the intensity of G band ($2D_{int}/G_{int}$) satisfies $0.05 \leq 2D_{int}/G_{int}$.

It is also seen that the rate characteristics can be further improved when, in addition to the intensity ratio range of the G band and 2D band of the Raman spectrum, $0.1 \leq 2D_{int}/G_{int}$ is satisfied.

Examples 16 to 19 and Comparative Example 7

In Examples 16 to 19 and Comparative Example 7, the active material particles of the positive electrode were modified to spinel manganese ($Li_{1.0}Mn_{2.0}O_{4.0}$) particles with an average particle diameter of secondary particles of 15 μm. Further, the processing condition during the fabrication of the coating layer including multilayer graphene on the active material particle surface using the Hosokawa Micron Mechanofusion system, and thermal processing condition after the coating layer formation were modified. In this way, positive electrodes including the coating layer with different Raman spectra were fabricated. Battery cells were fabricated in the same way as in Example 1 and evaluated. The results are shown in Table 4.

From Table 4, it is seen that the positive electrode active material with the coating layer including graphene or multilayer graphene formed on at least a part of the particle surface of spinel manganese ($Li_{1.0}Mn_{2.0}O_{4.0}$) exhibits high rate characteristics among positive electrode active materials with similar composition ratios when, with respect to the Raman spectrum in the coating layer, the intensity of 2D band normalized by the intensity of G band ($2D_{int}/G_{int}$) satisfies $0.05 \leq 2D_{int}/G_{int}$. It is shown that as a result, the battery energy density is improved.

The results also indicate that the rate characteristics are further improved when, in addition to the intensity ratio range of the G band and 2D band of the Raman spectrum, $0.1 \leq 2D_{int}/G_{int}$ is satisfied.

Examples 20 to 23 and Comparative Example 8

In Examples 20 to 23 and Comparative Example 8, the active material particles of the positive electrode were modified to lithium iron phosphate ($LiFePO_4$) particles with an average particle diameter of secondary particles of 5 μm. Further, the processing condition during the fabrication of the coating layer including multilayer graphene on the active material particle surface using the Hosokawa Micron Mechanofusion system, and thermal processing condition after the coating layer formation were modified. In this way, positive electrodes including the coating layer with different Raman spectra were fabricated. Battery cells were fabricated in the same way as in Example 1 and evaluated. The results are shown in Table 5.

TABLE 4

| | Active material | Coating film formation condition | | Raman spectrum | | Rate characteristics |
|---|---|---|---|---|---|---|
| | | Mechanofusion processing condition | Thermal processing condition | D band intensity/ G band intensity | 2D band intensity/ G band intensity | 1 C capacity/ 0.1 C capacity |
| Example 16 | $Li_{1.0}Mn_{2.0}O_{4.0}$ | 3500 rpm, 20 min | 300° C., 60 min @vacuum | 1.065 | 0.070 | 74% |
| Example 17 | $Li_{1.0}Mn_{2.0}O_{4.0}$ | 3500 rpm, 20 min | 400° C., 60 min @vacuum | 0.933 | 0.143 | 82% |
| Example 18 | $Li_{1.0}Mn_{2.0}O_{4.0}$ | 3000 rpm, 20 min | 400° C., 60 min @vacuum | 0.642 | 0.298 | 82% |
| Example 19 | $Li_{1.0}Mn_{2.0}O_{4.0}$ | 2700 rpm, 20 min | 400° C., 60 min @vacuum | 0.549 | 0.431 | 84% |
| Comparative Example 7 | $Li_{1.0}Mn_{2.0}O_{4.0}$ | 3500 rpm, 20 min | 300° C., 30 min @vacuum | 1.231 | 0.037 | 58% |

TABLE 5

| | Active material | Coating film formation condition | | Raman spectrum | | Rate characteristics |
| --- | --- | --- | --- | --- | --- | --- |
| | | Mechanofusion processing condition | Thermal processing condition | D band intensity/ G band intensity | 2D band intensity/ G band intensity | 1 C capacity/ 0.1 C capacity |
| Example 20 | LiFePO$_4$ | 3800 rpm, 20 min | 400° C., 30 min @vacuum | 1.118 | 0.082 | 71% |
| Example 21 | LiFePO$_4$ | 3500 rpm, 20 min | 300° C., 60 min @vacuum | 0.954 | 0.128 | 82% |
| Example 22 | LiFePO$_4$ | 3000 rpm, 20 min | 400° C., 30 min @vacuum | 0.610 | 0.306 | 83% |
| Example 23 | LiFePO$_4$ | 3000 rpm, 20 min | 400° C., 60 min @vacuum | 0.537 | 0.434 | 84% |
| Comparative Example 8 | LiFePO$_4$ | 3800 rpm, 20 min | 300° C., 30 min @vacuum | 1.204 | 0.039 | 54% |

From Table 5, it is seen that the positive electrode active material with the coating layer including graphene or multilayer graphene formed on at least a part of the particle surface of lithium iron phosphate (LiFePO$_4$) exhibits high rate characteristics among positive electrode active materials with similar composition ratios when, with respect to the Raman spectrum in the coating layer, the intensity of 2D band normalized by the intensity of G band ($2D_{int}/G_{int}$) satisfies $0.05 \leq 2D_{int}/G_{int}$. It is shown that as a result, the battery energy density is improved.

The results also indicate that the rate characteristics are further improved when, in addition to the intensity ratio range of the G band and 2D band of the Raman spectrum, $0.1 \leq 2D_{int}/G_{int}$ is satisfied.

As will be seen from the evaluated results, it was confirmed that Examples exhibit higher rate characteristics than Comparative Examples.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode active material for lithium ion secondary battery, comprising:
   active material particles including one or more compounds including Li and a transition metal; and
   a coating layer coating at least a part of a surface of the active material particles,
   wherein the coating layer includes at least one of graphene or multilayer graphene,
   the coating layer has a Raman spectrum with a G band, a D band and a 2D band, where the G band is a peak of 1530 cm$^{-1}$ to 1630 cm$^{-1}$, the D band is a peak of 1300 cm$^{-1}$ to 1400 cm$^{-1}$, and the 2D band is a peak of 2650 cm$^{-1}$ to 2750 cm$^{-1}$,
   at least the intensity of the 2D band normalized by the intensity of the G band ($2D_{int}/G_{int}$) satisfies $0.05 \leq 2D_{int}/G_{int} \leq 0.438$, and
   the intensity of the D band normalized by the intensity of the G band ($D_{int}/G_{int}$) satisfies $0.513 \leq D_{int}/G_{int} \leq 0.964$.

2. The positive electrode active material for lithium ion secondary battery according to claim 1, wherein the intensity of the D band normalized by the intensity of the G band ($D_{int}/G_{int}$) satisfies $0.6 \leq D_{int}/G_{int} \leq 0.964$.

3. The positive electrode active material for lithium ion secondary battery according to claim 1, wherein the intensity of the 2D band normalized by the intensity of the G band ($2D_{int}/G_{int}$) satisfies $0.1 \leq 2D_{int}/G_{int} \leq 0.438$.

4. The positive electrode active material for lithium ion secondary battery according to claim 3, wherein the intensity of the D band normalized by the intensity of the G band ($D_{int}/G_{int}$) satisfies $0.6 \leq D_{int}/G_{int} \leq 0.964$.

5. A positive electrode for lithium ion secondary battery, comprising the positive electrode active material for lithium ion secondary battery according to claim 1.

6. A positive electrode for lithium ion secondary battery, the electrode comprising the positive electrode active material for lithium ion secondary battery according to claim 2.

7. A positive electrode for lithium ion secondary battery, comprising the positive electrode active material for lithium ion secondary battery according to claim 3.

8. A positive electrode for lithium ion secondary battery, comprising the positive electrode active material for lithium ion secondary battery according to claim 4.

9. A lithium ion secondary battery comprising:
   the positive electrode for lithium ion secondary battery according to claim 5;
   a negative electrode including a negative electrode active material;
   a separator disposed between the positive electrode and the negative electrode; and
   a nonaqueous electrolyte.

10. A lithium ion secondary battery comprising:
    the positive electrode for lithium ion secondary battery according to claim 6;
    a negative electrode including a negative electrode active material;
    a separator disposed between the positive electrode and the negative electrode; and
    a nonaqueous electrolyte.

11. A lithium ion secondary battery comprising:
    the positive electrode for lithium ion secondary battery according to claim 7;
    a negative electrode including a negative electrode active material;
    a separator disposed between the positive electrode and the negative electrode; and
    a nonaqueous electrolyte.

12. A lithium ion secondary battery comprising:
    the positive electrode for lithium ion secondary battery according to claim 8;
    a negative electrode including a negative electrode active material;
    a separator disposed between the positive electrode and the negative electrode; and
    a nonaqueous electrolyte.

* * * * *